(No Model.)

2 Sheets—Sheet 1.

V. L. RICE.
GRINDING MILL.

No. 445,821.          Patented Feb. 3, 1891.

WITNESSES:

INVENTOR

BY

HIS ATTORNEY (No Model.)   2 Sheets—Sheet 2.

V. L. RICE.
GRINDING MILL.

No. 445,821.   Patented Feb. 3, 1891.

WITNESSES:

INVENTOR

HIS ATTORNEY

UNITED STATES PATENT OFFICE.

VIETTS L. RICE, OF NEW YORK, N. Y.

GRINDING-MILL.

SPECIFICATION forming part of Letters Patent No. 445,821, dated February 3, 1891.

Application filed July 24, 1890. Serial No. 359,753. (No model.)

*To all whom it may concern:*

Be it known that I, VIETTS L. RICE, of New York, in the county and State of New York, have invented a certain new and useful Improvement in Grinding-Mills, of which the following is a specification.

I will describe a grinding-mill embodying my improvement, and then point out the novel features in the claims.

Figure 1:
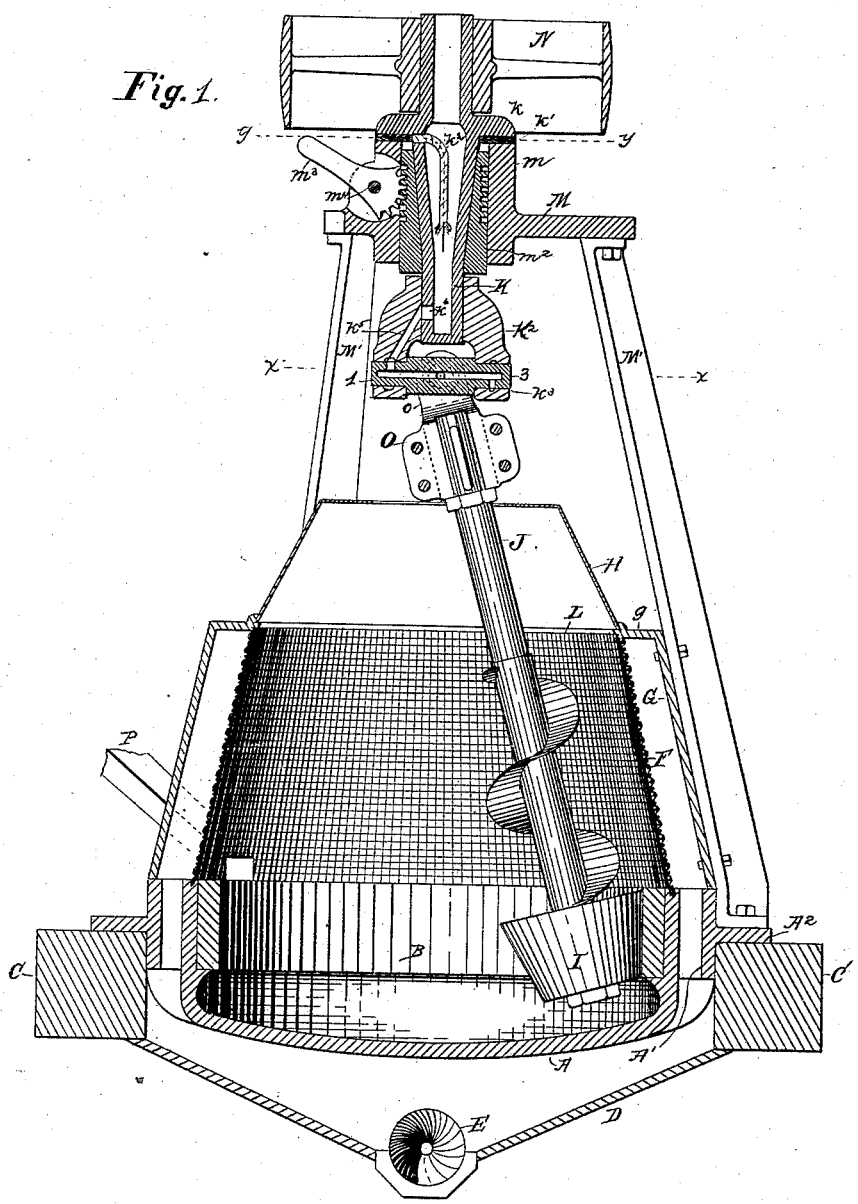
Figure 2:
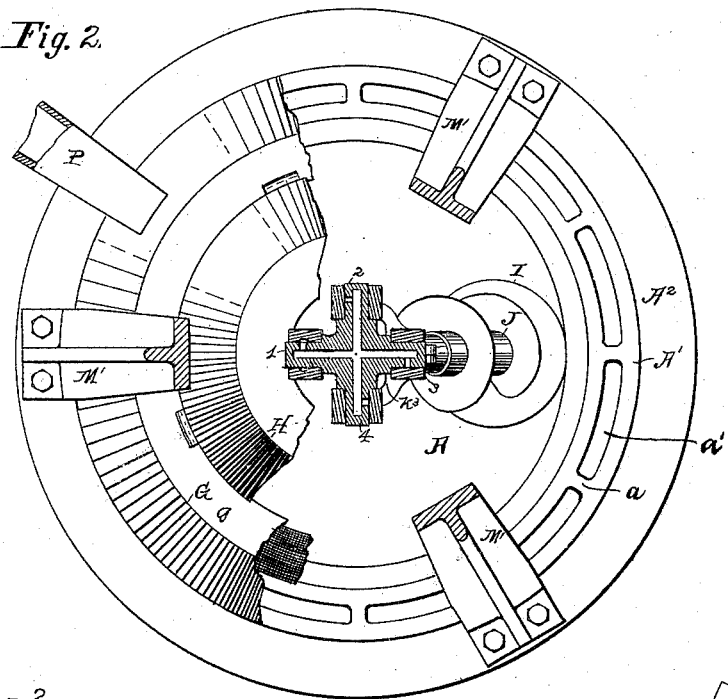
Figure 3:
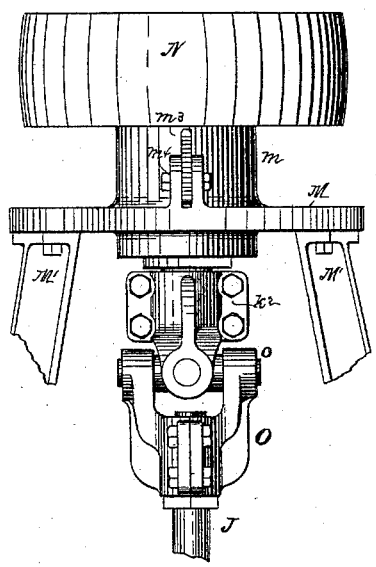
Figure 4:
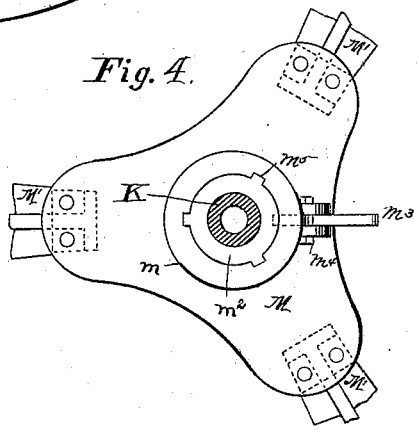

In the accompanying drawings, Figure 1 is a central vertical section of a grinding-mill embodying my improvement. Fig. 2 is a horizontal section of the same, taken at the plane of the dotted line $x$ $x$, Fig. 1; but some of the parts below are removed to enable others to be exhibited. Fig. 3 is a side elevation of the upper part of the machine. Fig. 4 is a horizontal section taken at the plane of the dotted line $y$ $y$, Fig. 1.

Similar letters and numerals of reference designate corresponding parts in all the figures.

A designates a chamber of circular form, which may be made of any desired material, preferably cast-iron. In its upper portion is fitted a ring B, which will preferably be made of steel, as it forms one of the wearing-surfaces whereby the grinding is done. Around the upper part of this chamber is a ring A', which is connected with the chamber at intervals by radial ribs $a$. Between the ribs are passages $a'$, through which ground material may descend. From the ring A' a flange $A^2$ extends outwardly to rest upon girders or other supports C. Below the girders a hopper D is fastened. It receives material which descends through the passages formed between the chamber and the ring A', and is provided with a conveyer E, whereby such material may be taken off.

Above the chamber A is an upwardly-tapering screen F of wire-cloth or other reticulated or foraminated material. Material to be ground may be fed through a chute P, communicating at its inner end through a hole in the screen F with the chamber A. From the upper ring extends an upwardly-tapering shell G, which surrounds the screen F, but is considerably larger than the latter, so that a space is formed between it and the screen. Material after being ground escapes through this screen F, falls down between the screen and the shell G, descends thence through the passages which are formed between the chamber A and the ring A', and on reaching the hopper D is carried off by the conveyer E. The shell G preferably has at the upper end an inwardly-turned flange $g$, which serves as a support for the upper end of the screen F. Preferably a conical shell H, having a central opening, is fastened to the inner edge of the upper extremity of the shell G. This serves to prevent ground material from escaping at the top of the space surrounded by the screen.

I designates a roll. (Here shown as tapering downwardly to such an extent that when in an operative position the outer portion of its periphery will be parallel with the inner surface of the ring B.) This roll I is affixed to a shaft J, which is so connected with the main shaft K that when the main shaft is rotated and imparts motion to the shaft J the latter will be by centrifugal force swung outward, so that the roll will operate in conjunction with the ring B. The roll-shaft J is provided with a spiral flange. As the roll, in conjunction with the ring B, operates to grind material, the flange will carry up the ground material and the latter will be projected against the screen and will pass through the meshes. Whenever the motion of the main shaft K is stopped, the shaft J will swing into a vertical position in line with the center of the chamber A, and the roll will of course be far removed from the ring B, so that when set in motion the roll will operate gradually from the center of the material in the chamber toward the ring B, so that the material is thoroughly agitated and operated upon. The main shaft K is supported by the head M of a frame M', consisting of such head and legs $m'$, whereby the head is supported. These legs may be bolted to the head and also bolted to the flange $A^2$ of the ring A', which is formed on the chamber A. The head M has a central hub $m$, provided with a cylindric hole opposite the center of the chamber A. In this hole is fitted a sleeve $m^2$, which is provided externally with circumferential ribs and grooves and is downwardly tapered in its interior. This sleeve forms a bearing for the shaft K, and consequently the portion of the shaft which fits within it is downwardly tapered.

A lever $m^3$, fulcrumed by a pin $m^4$ to the head M and having a series of teeth arranged concentrically with its pivot-pin, engages with the sleeve $m^2$ and serves as a means for elevating and lowering it as well as retaining it in position. Preferably this sleeve will have radial ribs $m^5$, and the hub of the head will internally be provided with corresponding grooves in order to prevent the sleeve from rotating in the head. Nevertheless the sleeve may be taken out, partially rotated, and put back in a different position to present different surfaces for wear. The shaft K is hollow or tubular. Near the upper end it has a laterally-extending flange $k$, which is supported by the upper end of the hub $m$ of the head M. Preferably washers $k'$ will be introduced between the upper extremity of the said hub $m$ and the under side of the flange $k$. The shaft is intended to contain oil for lubricating the various parts of the machine. Opposite the washers $k'$ it has a radial hole through which a piece of wicking $k^2$ extends. This wicking will take up oil from the interior of the shaft and conduct it to the washers, the hub $m$, and the flange $k$. A driving-pulley N is affixed to the upper extremity of the main shaft K. The lower extremity of the shaft K has affixed to it a head $K^2$, which at the lower end has bearings for two arms of a cross $k^3$. This cross has four arms 1 2 3 4. Its two arms 1 3, which fit the head, are free to oscillate in the head. Its other two arms 2 4 have fitted to them two journal-boxes $o$, extending from a head O. The head O can therefore oscillate relatively to the cross-piece in the reverse direction to the oscillations of which the cross-piece is capable. The head O has the roll-shaft J rotating in it. The head $K^2$ is made of two corresponding sections, which may be fitted in place and clamped together, as may be readily understood by reference to Fig. 3, and the head O is similarly made, as can be seen in Fig. 3 and also in Fig. 1.

In one part of the head $K^2$ is a passage $k^5$, and opposite this passage the shaft K has a hole $k^6$ formed in it. One of these passages extends lengthwise of the arms 1 3 and the other lengthwise of the arms 2 4. That one which extends through the arms 1 3 communicates by means of a radial hole with the oil-passage $k^5$ of the head K. Hence oil may flow through the passage $k^5$ not only to supply the bearing for the arm 1 of the cross $k^3$, but also may flow to the interior of the cross $k^3$. Each of the other arms 2 3 4 has a radial passage which permits oil to flow out from the cross to lubricate the bearings in the heads $K^2$ and O.

What I claim as my invention, and desire to secure by Letters Patent, is—

1. In a grinding-mill, the combination of an internally-circular chamber, a main shaft arranged above the center of the same, a roll-shaft connected by a universal joint with the main shaft in a line with the center of the chamber, having a roll at its lower end for revolving around the interior of the chamber, and a spiral flange around the roll-shaft, substantially as specified.

2. In a grinding-mill, the combination of an internally-circular chamber, a hollow main shaft arranged above the center of the same, a roll-shaft, a cross having four arms provided with oil-passages, a head connected with the hollow main shaft and having a passage establishing communication between said main shaft and one of the arms of the cross, and a head fastened to the roll-shaft and provided with bearings receiving oil from the arms, which fit in said bearings, substantially as specified.

3. In a grinding-mill, the combination of an internally-circular chamber, a main shaft arranged above the same and provided with a lateral flange and a frame comprising a head whereby said flange is supported, and a roll-shaft connected by a universal joint with the main shaft and having a roll at its end, substantially as specified.

4. In a grinding-mill, the combination of an internally-circular chamber, a main shaft arranged above the center of the same and provided with a lateral flange, a frame consisting of a head which supports the flange and legs which are bolted to the head and bolted to a flange extending beyond the said chamber, and a shaft carrying a roll connected to the main shaft in a line with the center of the chamber, substantially as specified.

5. In a grinding-mill, the combination of an internally-circular chamber, a hollow main shaft arranged above the center of the same and provided with a lateral flange, a frame consisting of a head which supports the flange and legs which are bolted to the head and bolted to a flange extending from said chamber, a radial hole $k^6$ for the escape of oil from the main shaft below the flange, and a shaft working in bearings receiving oil from said hole, carrying a roll and connected by a universal coupling to the main shaft, substantially as specified.

In testimony whereof I have signed my name to this specification in the presence of two subscribing witnesses.

VIETTS L. RICE.

Witnesses:
C. R. FERGUSON,
S. O. EDMONDS.